(12) United States Patent
Mai et al.

(10) Patent No.: US 8,743,743 B1
(45) Date of Patent: Jun. 3, 2014

(54) MANAGEMENT OF MUTE AND UNMUTE REQUESTS DURING AN ELECTRONIC-CONFERENCE SESSION

(71) Applicant: Cisco Technology, Inc., San Jose, CA (US)

(72) Inventors: Lan Betty Ngoc Mai, Seattle, WA (US); Joshua Pacheco Rose, Seattle, WA (US); Alan Darryl Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/718,972

(22) Filed: Dec. 18, 2012

(51) Int. Cl.
*H04Q 11/00* (2006.01)

(52) U.S. Cl.
USPC .......................................... 370/260; 381/104

(58) Field of Classification Search
USPC ............................ 370/260; 381/104, 310, 381
See application file for complete search history.

(56) References Cited

U.S. PATENT DOCUMENTS

| 4,796,293 | A | 1/1989 | Blinken et al. |
| 5,913,062 | A | 6/1999 | Vrvilo et al. |
| 6,735,193 | B1 | 5/2004 | Bauer et al. |
| 6,915,331 | B2 | 7/2005 | Fuller et al. |
| 8,116,442 | B2 | 2/2012 | Remaker |
| 2006/0126538 | A1* | 6/2006 | Krstulich ....................... 370/260 |
| 2010/0308044 | A1* | 12/2010 | Perry et al. .................... 220/200 |

* cited by examiner

*Primary Examiner* — Patrick Edouard
*Assistant Examiner* — Myron K Wyche
(74) *Attorney, Agent, or Firm* — Baker Botts L.L.P.

(57) ABSTRACT

In certain embodiments, a method includes receiving, from a first participant of a plurality of participants in an electronic-conference session, a mute request. The mute request comprises information indicating a request to mute communication from a second participant of the plurality of participants in the electronic-conference session, information identifying the first participant as a mute requester, and information identifying the second participant as a mutee. The method includes muting, in response to the mute request, communication from the second participant. The method includes sending, to one or more user devices, the information identifying the first participant as the mute requester and the information identifying the second participant as the mutee.

17 Claims, 5 Drawing Sheets

FIG. 1

| PARTICIPANT ID | ENDPOINT ID | HOST | MUTE STATE | MUTE REQUESTER ID | MUTE EXPLANATION |
|---|---|---|---|---|---|
| PARTICIPANT A | CONFERENCE ROOM A | Y | NOT MUTED | N/A | N/A |
| PARTICIPANT B | CONFERENCE ROOM B | N | MUTED | PARTICIPANT B | CALLING IN FROM NOISY WORK SPACE |
| PARTICIPANT C | CONFERENCE ROOM C | N | MUTED | PARTICIPANT A | TOO MUCH BACKGROUND NOISE |
| PARTICIPANT D | CONFERENCE ROOM C | N | MUTED | PARTICIPANT A | TOO MUCH BACKGROUND NOISE |
| PARTICIPANT E | CONFERENCE ROOM C | N | MUTED | PARTICIPANT A | TOO MUCH BACKGROUND NOISE |

MANAGEMENT OF MUTE AND UNMUTE REQUESTS DURING AN ELECTRONIC-CONFERENCE SESSION

TECHNICAL FIELD

This disclosure relates generally to communications and, more specifically, to management of mute and unmute requests during an electronic conference.

BACKGROUND

Two or more people may wish to communicate with one another when not all of the two or more people are at the same location. For example, for some conferences or meetings, not all the attendees or participants may be in the same location. For example, some of the participants may be in one conference room, while other participants may be in another conference room and/or at various separate remote locations. A host or other participant may wish to hear what the other participants in other locations are saying. Participants may join an electronic-conference session to accomplish this.

BRIEF DESCRIPTION OF THE DRAWINGS

For a more complete understanding of the present disclosure and its advantages, reference is now made to the following description, taken in conjunction with the accompanying drawings, in which.

DESCRIPTION OF EXAMPLE EMBODIMENTS

Overview

In certain embodiments, a method includes receiving, from a first participant of a plurality of participants in an electronic-conference session, a mute request. The mute request comprises information indicating a request to mute communication from a second participant of the plurality of participants in the electronic-conference session, information identifying the first participant as a mute requester, and information identifying the second participant as a mute. The method includes muting, in response to the mute request, communication from the second participant. The method includes sending, to one or more user devices, the information identifying the first participant as the mute requester and the information identifying the second participant as the mutee.

Example Embodiments

Figure 1:
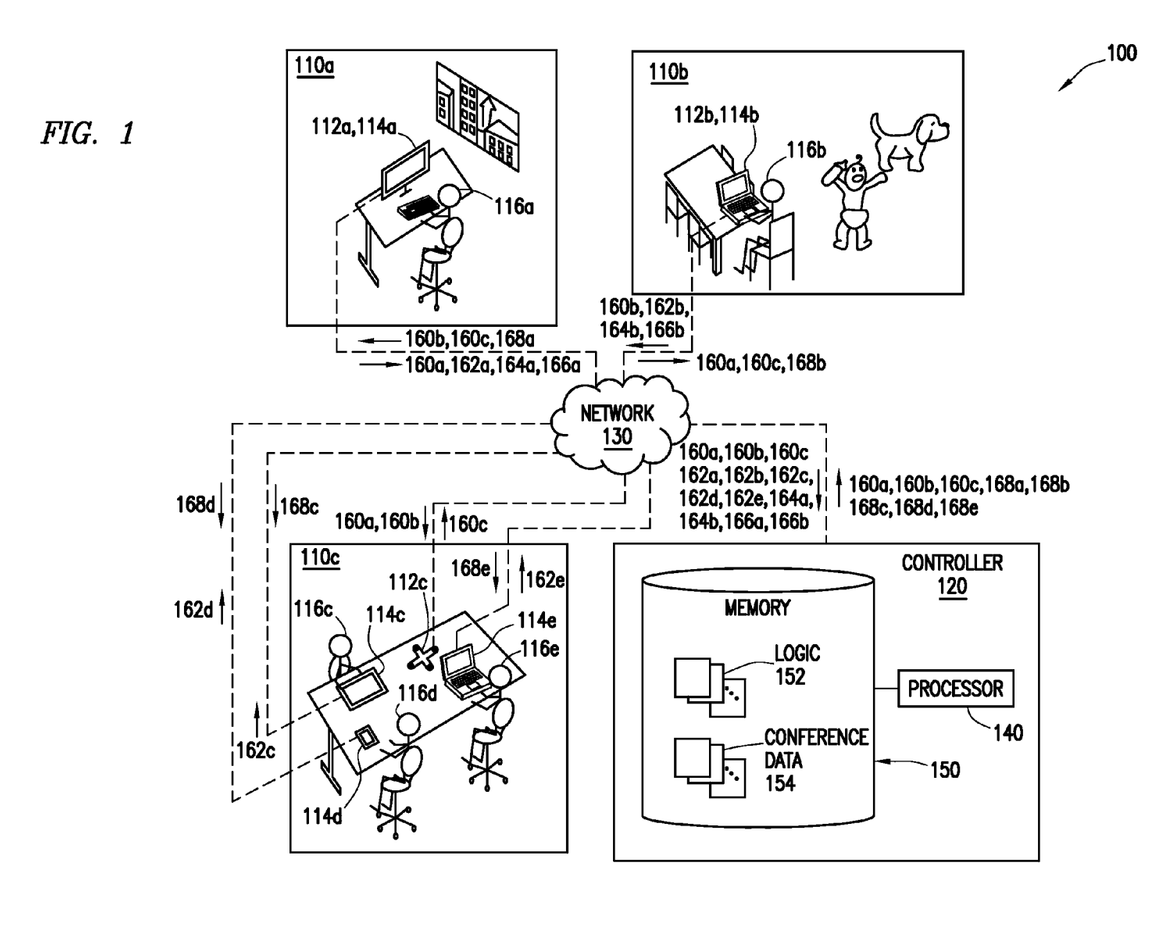
FIG. 1 illustrates an example conferencing system, according to certain embodiments of the present disclosure.

FIG. 1 illustrates an example conferencing system 100, according to certain embodiments of the present disclosure. In general, conferencing system 100 may allow multiple participants 116, some or all of whom may be in different and possibly geographically remote locations, to participate in an electronic-conference session. An electronic-conference session may represent any meeting, conversation, or discussion between participants 116. For example, conferencing system 100 may allow each participant 116 to hear voice communication from remote participants 116.

Conferencing system 100 may allow one or more participants 116 to mute their own communications, such as audio and/or video communications, by sending mute requests 164. Additionally or alternatively, conferencing system 100 may allow one or more participants 116 to mute communications from one or more other participants 116 by sending mute requests 164. Conferencing system 100 may allow one or more participants 116 to unmute their own respective communications by sending unmute requests 166. Additionally or alternatively, conferencing system 100 may allow one or more participants 116 to unmute communications from one or more other participants 116 by sending unmute requests 166.

Conferencing system 100 may include notifications 168 that indicate, on user devices 114, mute statuses of participants 116, indicating whether participants 116 are currently muted or not muted. This may provide the advantage of letting participants 116 know whether they are currently muted or not muted, allowing participants 116 to avoid embarrassing or otherwise unwanted situations.

Conferencing system 100 may also include notifications 168 that indicate which user device 114 and/or corresponding participant 116 originated mute requests 164 and/or unmute requests 166. Conferencing system 100 may allow participants 116 sending mute requests 164 and/or unmute requests 166 to input a corresponding explanation and may include notifications 168 for display on user devices 114 including the explanation. Allowing the input and notification of this additional information about the mute may provide participants 116 with improved information about the status of participants 116 and may also allow participants 116 to make more informed decisions with respect to subsequent mute requests 164 and unmute requests 166.

Conferencing system 100 may also include rules that deny certain participants 116 from submitting and/or allow certain participants 116 to submit mute requests 164 and/or unmute requests 166. These rules may prevent unwanted scenarios caused by mute requests 164 and/or unmute requests 166.

Conferencing system 100 may include one or more conference locations 110, one or more endpoints 112, one or more user devices 114, one or more participants 116, and controller 120. Endpoints 112, user devices 114, and controller 120 may be communicatively coupled by a network 130. Each of these example components of conferencing system 100 will be discussed below.

Conference locations 110 may be any location from which one or more participants 116 participate in an electronic-conference session. In the example of FIG. 1, participant 116a is located in a first conference location 110a, participant 116b is located in a second conference location 110b, and participants 116c-e are located in a third conference location 110c. One or more conference locations 110a-c may be remote from the other conference locations 110a-c. In certain other embodiments, multiple participants 116 may be located in conference locations 110a-b. Although three conference locations 110 are illustrated and primarily described, conferencing system 100 may include any suitable number of conference locations 110, and any suitable number of participants 116 may be located at each conference location 110. As just a few examples, conference location 110 may include a conference room, an office, a home, or any other suitable location.

Each conference location 110 may include an endpoint 112. Endpoint 112 may refer to any device or combination of devices that connects conference location 110 to an electronic-conference session. Endpoint 112 may be operable to capture audio from conference location 110 (e.g. using one or more microphones) and transmit media signal 160 in the form of an audio signal to endpoints 112 at other conference locations 110 (e.g., through controller 120). Endpoint 112 may also be operable to play audio signals received from other endpoints 112. Endpoints 112 may be operable to capture video from conference location 110 (e.g., using one or more cameras) and transmit media signal 160 in the form of a video signal to endpoints 112 at other conference locations 110 (e.g., through controller 120). Endpoint 112 may also be operable to play video signals received from other endpoints 112. In some embodiments, endpoint 112 may include a speakerphone, conference phone, telephone, computer, workstation, Internet browser, electronic notebook, Personal Digital Assistant (PDA), cellular or mobile phone, pager, camera, or any other suitable device (wireless, wireline, or otherwise), component, or element capable of receiving, processing, storing, and/or communicating information with other components of conferencing system 100. Endpoint 112 may also comprise any suitable user interface such as a display, microphone, speaker, keyboard, or any other appropriate terminal equipment usable by participant 116. Conferencing system 100 may comprise any suitable number and combination of endpoints 112.

User devices 114 may refer to any device that enables participant 116 to interact with controller 120. In some embodiments, user device 114 may include a computer, workstation, telephone, Internet browser, electronic notebook, laptop computer, Personal Digital Assistant (PDA), cellular or mobile phone, pager, or any other suitable device (wireless, wireline, or otherwise), component, or element capable of receiving, processing, storing, and/or communicating information with other components of conferencing system 100. User device 114 may also comprise any suitable user interface such as a display, microphone, keyboard, or any other appropriate equipment usable by participant 116. Conferencing system 100 may comprise any number and combination of user devices 114. In some embodiments, each participant 116 may have a corresponding user device 114 situated near each participant 116. In other embodiments, only some participants 116 may have a user device 114.

In certain embodiments, a single device may be both an endpoint 112 and a user device 114. For example, in the illustrated example, endpoint 112a is also user device 114a.

In certain embodiments, network 130 may refer to any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In certain embodiments, controller 120 may include any suitable combination of hardware, firmware, and software implemented in one or more modules and operated to process data and provide some or all of the described operations. In certain embodiments, controller 120 and/or logic 152 may include a conferencing solution operable to implement and manage a teleconference. In certain embodiments, the operations described herein may be performed by multiple controllers 120. In certain embodiments, controller 120 may include, for example, a mainframe, server, host computer, workstation, web server, file server, a personal computer such as a laptop, or any other suitable device operable to process data. In certain embodiments, controller 120 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In certain embodiments, controller 120 may be a web server running Microsoft's Internet Information Server™. Controller 120 may include processor 140 and memory 150.

In general, controller 120 communicates with endpoints 112 and user devices 114 to facilitate an electronic-conference session among participants 116. In some embodiments, controller 120 may include processor 140 and memory 150. Memory 150 may refer to any suitable device capable of storing and facilitating retrieval of data and/or instructions. Examples of memory 150 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other volatile or non-volatile computer-readable memory devices that store one or more files, lists, tables, or other arrangements of information. Although FIG. 1 illustrates memory 150 as internal to controller 120, it should be understood that memory 150 may be internal or external to controller 120, depending on particular implementations. Also, memory 150 may be separate from or integral to other memory devices to achieve any suitable arrangement of memory devices for use in conferencing system 100.

Memory 150 may store logic 152 and conference data 154. Logic 152 generally refers to logic, rules, algorithms, code, tables, and/or other suitable instructions for performing the described operations. Conference data 154 may be any suitable data received from end points 112 or user devices 114, or determined by logic 152.

Memory 150 is communicatively coupled to processor 140. Processor 140 is generally operable to execute logic 152 stored in memory 150 to facilitate an electronic-conference session among participants 116 according to the disclosure.

Processor 140 may include one or more microprocessors, controllers, or any other suitable computing devices or resources. Processor 140 may work, either alone or with components of conferencing system 100, to provide a portion or all of the functionality of conferencing system 100 described herein. In some embodiments, processor 140 may include, for example, any type of central processing unit (CPU).

In operation, logic 152, when executed by processor 140, facilitates an electronic-conference session among participants 116. Logic 152 may receive media signals 160 from endpoints 112. In the example of FIG. 1, logic 152 receives media signal 160a from endpoint 112a, media signal 160b from endpoint 112b, and media signal 160c from endpoint 112c. Media signal 160 may include any suitable type of media, according to particular needs. For example, media signal 160 may represent audio captured by endpoint 112, such as the voices of participants 116 proximate endpoint 112. Additionally or alternatively, media signal 160 may represent video captured by endpoint 112, such as the video of participants 116 proximate endpoint 112. Logic 152 may route media signals 160 between endpoints 112. In the example of FIG. 1, logic 152 transmits media signal 160a to endpoints 112b and 112c, transmits media signal 160b to endpoints 112a and 112c, and transmits media signal 160c to endpoints 112a and 112b. In other embodiments, logic 152 may facilitate a connection between endpoints 112 so that endpoints 112 may communicate directly to exchange media signals 160.

Logic 152 may also receive join requests 162 from user devices 114. Join requests 162 may represent requests to join an electronic-conference session. In the example of FIG. 1, logic 152 receives join requests 162a-e from user devices 114a-e, respectively. In some embodiments, join requests 162 may include a username. The username may represent and/or be selected by the particular participant 116 who is operating the particular user device 114 submitting the particular join request 162. In certain embodiments, logic 152 may determine the location of user device 114 relative to endpoints 112. For example, logic 152 may determine that user device 114a is proximate endpoint 112a or that user device 114a is the same device as endpoint 112a. This determination may be made using any suitable method, including asking participant 116 to identify his or her location.

Logic 152 may also receive mute requests 164 from user devices 114. Mute requests 164 may represent requests to mute communication from one or more participants 116 by muting media, such as a portion or all of media signals 160, from one or more endpoints 112. For example, mute request 164 may represent a request to mute audio signals. As another example, mute request 164 may represent a request to mute video signals. As another example, mute request 164 may represent a request to mute both audio and video signals. In the example of FIG. 1, logic 152 receives mute requests 164a and 164b from user devices 114a and 114b, respectively. In some embodiments, mute requests 164 may include a mute-requester ID. The mute-requester ID may represent the particular participant 116 associated with the particular user device 114 originating the mute request 164. In some embodiments, mute requests 164 may include a mutee ID. The mutee ID may represent the particular endpoint 112 from which the mute requester would like to mute or unmute media and/or particular participants 116 associated with that endpoint 112. In some embodiments, mute requests 164 may include a mute explanation. The mute explanation may represent a reason for the mute request 164, as indicated by participant 116 who is operating the particular user device 114 submitting the mute request 164. For example, in the illustrated example, participant 116b submitting mute request 164b to mute endpoint 112b may input an explanation of "Calling in from noisy workspace." Controller 120 may receive this explanation and send it to user devices 114 for display or other indication, such as by sound. This may allow participants 116 to have additional information regarding the muted status of participant 116b, allowing participants 116 to make better-informed decisions. For example, participant 116a may, in response to this information, decide not to send a request to unmute media signal 160b from participant 116b. This may avoid unwanted scenarios like, for example, participant 116b being unmuted while his or her child is making noise in the same room as participant 116b.

Logic 152 may also receive unmute requests 166 from user devices 114. Unmute requests 166 may represent requests to unmute media from one or more endpoints 112. In the example of FIG. 1, logic 152 receives unmute request 166a from user device 114a. In some embodiments, unmute requests 166 may include an unmute-requester ID. The umute-requester ID may represent a particular participant 116 associated with a particular user device 114 submitting the unmute request 166. In some embodiments, unmute requests 166 may include an unmutee ID. The unmutee ID may represent a particular endpoint 112 from which the unmute requester would like to unmute media. In some embodiments, unmute requests 166 may include an unmute explanation. The unmute explanation may represent a reason for the unmute request 166, as indicated by participant 116 who is operating the particular user device 114 submitting unmute request 166. This may provide the advantage of providing participants 116 with improved information about the muted or unmuted status of participants 116.

Logic 152 may include rules for determining how controller 120 should respond to mute requests 164 and unmute requests 166. Logic 152 may include rules based on information in mute requests 164 and/or unmute requests 166 and conference data 154. Logic 152 may include rules that dictate which mute requests 164 and unmute requests 166 will result in mutes and unmutes, respectively, and which will be denied. This may provide the advantage of avoiding unwanted situations. For example, logic 152 may include a rule that first participant 116 may only unmute second participant 116 if first participant 116 had most recently muted second participant 116. For example, participant 116b may submit a mute request 164b to mute media signal 160b because participant 116b is in a noisy room. Logic 152 may include rules that, when applied to conference data 154 indicating that participant 116b submitted the mute request 164, only allows participant 116b to submit unmute request 166b to unmute media signal 160b. Alternatively, logic 152 may allow others to submit unmute requests 166 but may deny those requests. As another alternative, logic 152 may allow others to submit unmute requests 166 but may prompt participant 116b to allow or deny the request. As an additional alternative, logic 152 may allow another participant 116 to submit unmute request 166 but, before, during, or after controller 120 unmutes media signal 160b, controller 120 may send notification 168 to user device 114b to display or otherwise indicate to participant 116b that media signal 160b is being unmuted. Any or a combination of these rules may allow for avoidance of embarrassing or otherwise unwanted scenarios. For example, they may avoid media signal 160b being unmuted without participant 116b being warned when, for example, participant 116b is still in a noisy room or when participant 116b is talking without intending for other participants 116 in the electronic-conference session to hear.

Notifications 168 may be information sent from controller 120 to user devices 114 to notify participants of mute requests 164, unmute requests 166, changes to the mute status of participants, and/or any other suitable information. For example, controller 120 may send notifications 168c-e to user devices 114c-e, indicating that participant 116a at user device 114a has requested that endpoint 112c be muted and has indicated a mute explanation of "Too much background noise." As another example, notifications 168 may be sent to user devices 114 to indicate mute statuses of participants 116, the originator of a particular mute request 164 or unmute request 166, an indication that a particular participant 116 has requested an unmute, or any other suitable information that provides participants 116 with better information about mute status, origination, and/or explanation, or otherwise provides warning to participants 116 about recent, imminent, or potential changes to mute status, or prompts participants 116 to make decisions regarding changes to mute status. Notifications 168 may allow participants 116 to make informed decisions regarding mute requests 164 and unmute requests 166 and/or may provide warning regarding changes to mute statuses. These may provide the advantage of avoiding unpleasant and/or unintended user experiences.

Figure 2:
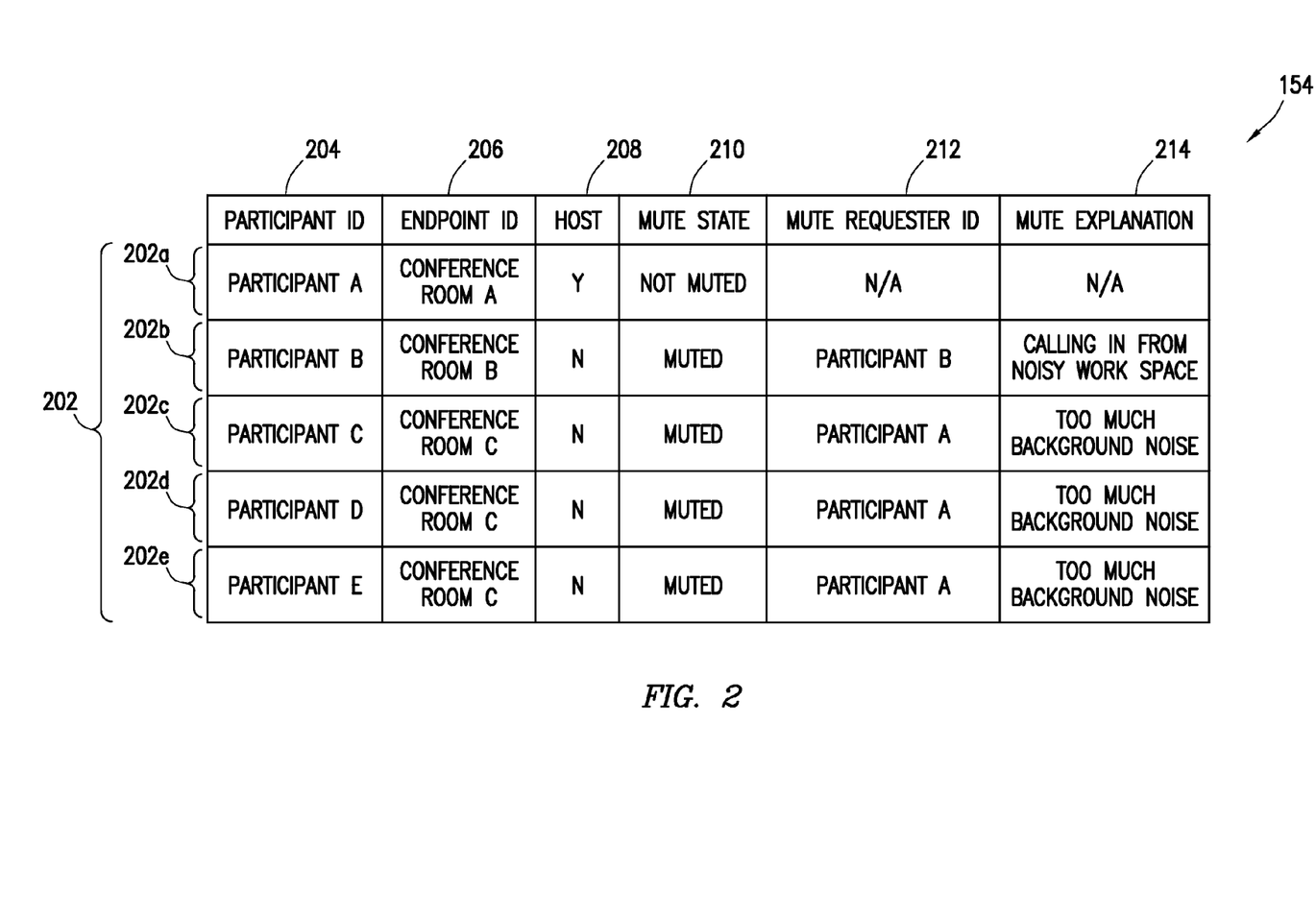
FIG. 2 illustrates an example of conference data that may be generated by the system of FIG. 1, according to certain embodiments of the present disclosure.

FIG. 2 illustrates an example of conference data 154 that may be generated by the system of FIG. 1, according to certain embodiments of the present disclosure. Conference data 154 may be organized in rows 202 and columns.

Participant IDs 204 may be IDs representing participants 116 participating in the electronic-conference session. Participant ID 204 may be any suitable data that identifies one or more participants 116. Participant ID 204 may include a name, a username, an IP address, a MAC address, and/or any other suitable identifying information. Logic 152 may transmit Participant IDs 204 to endpoints 112 and/or user devices 114 for display or other indication, such as by sound, to participants 116.

Endpoint IDs 206 may be IDs representing endpoints 112, each endpoint being associated with one or more participants 116. Endpoint ID 206 may be any suitable data that identifies one or more endpoints 112. Endpoint ID 206 may include a name, a username, an IP address, a MAC address, and/or any other suitable identifying information. Logic 152 may transmit Endpoint IDs 206 to endpoints 112 and/or user devices 114 for display or other indication, such as by sound, to participants 116.

Host 208 may be data in a column identifying one or more participants 116 as a "Host" of the electronic-conference session. A "Host" may have special permissions according to rules in logic 152. Host 208 may be any suitable data that identifies one or more participants 116 that have special permissions during the electronic-conference session. Host 208 may include a name, a username, an IP address, a MAC address, and/or any other suitable identifying information. Logic 152 may transmit the determined host 208 to endpoints 112 and/or user devices 114 for display or other indication, such as by sound, to participants 116.

Mute state 210 may indicate whether or not each of participants 116 are in a "muted" state, meaning that media signal 160 associated with particular participant 116 has been muted. Logic 152 may transmit the mute states 210 to endpoints 112 and/or user devices 114 for display or other indication, such as by sound, to participants 116.

Mute requester IDs 212 may indicate, for each participant 116 currently in a "muted" state, the participant 116 associated with the user device 114 from which the mute request originated. Logic 152 may transmit mute requester IDs 212 to endpoints 112 and/or user devices 114 for display or other indication, such as by sound, to participants 116.

Mute explanations 214 may indicate, for each participant 116 currently in a "muted" state, the explanation that was input with associated mute request 164, if any. Logic 152 may transmit mute explanations 214 to endpoints 112 and/or user devices 114 for display or other indication, such as by sound, to participants 116.

In certain embodiments, controller 120 may use logic 152 to populate conference data 154 and may also apply logic 152 to conference data 154 to govern the way that conferencing system 100 operates. For example, controller 120 may change data in mute state 210, mute requester ID 212, and mute explanation 214 based on mute request 164. For example, in the illustrated embodiment, "Participant B," as represented in row 202b may initially be in mute state 210 of "not muted" with a corresponding mute requester ID 212 of "N/A" and mute explanation 214 of "N/A." Participant 116b, corresponding to "Participant B," may subsequently send mute request 164b to mute media signal 160b from endpoint 112b, corresponding to "Conference Room B," with an explanation of "Calling in from noisy work space." In response to this mute request 164b, controller 120 may update row 202b by changing mute status 210 from "not muted" to "muted," changing mute requester ID 212 from "N/A" to "Participant B," and changing mute explanation 214 from "N/A" to "Calling in from noisy workspace." Controller 120 may send this data to user devices 114 and/or endpoints 112 for display on GUIs or by other indication, such as by sound. Sending information in conference data 154 to user devices 114 and/or endpoints 112 for display to participants 116 may allow for one or more advantages. For example, providing this information to participants 116 may allow participants 116 to make better-informed decisions when participating in the electronic-conference session. For example, if another participant 116a sees that participant 116b has muted himself or herself and has provided an explanation of "Calling in from noisy workspace," participant 116a may avoid submitting unmute requests 166 to unmute media signal 160b. This may allow participants 116 to avoid embarrassing or otherwise unwanted scenarios, such as participant 116b being unmuted by participant 116a when participant 116b would rather not be because of noise proximate participant 116b.

In certain embodiments, controller 120 may apply logic 152 to restrict or allow mute requests 164 and/or unmute requests 166. For example, logic 152 may include a rule that will only allow the particular participant 116 or participants 116 identified as host 208 to input mute requests 164. Controller 120 may apply this rule to conference data 154 to determine that only "Participant A," being the only participant 116 identified as host 208 with a "Y" in the column corresponding to host 208, is allowed to make mute requests 164. As another example, logic 152 may include a rule that will only allow the particular participant 116 or participants 116 identified as host 208 to input unmute requests 166. Controller 120 may apply this rule to conference data 154 to determine that only "Participant A," being the only participant 116 identified as host 208 with a "Y" in the column corresponding to host 208, is allowed to make unmute requests 166. As another example, logic 152 may include a rule that will only allow unmute request 166 to unmute a muted participant 116 when the particular participant 116 submitting unmute request 166 is also the particular participant 116 who most recently muted the muted participant 116. For example, in the illustrated embodiment, controller 120 may apply this rule to conference data 152 so that the only participant 116 allowed to unmute "Conference Room B" (indicating conference location 110b/endpoint 112b) is "Participant B" (indicating participant 116b) and the only participant 116 allowed to unmute "Conference Room C" (indicating conference location 110c/endpoint 112c) is "Participant A" (indicating participant 116a). Additionally or alternatively, controller 120 may allow other participants 116 to submit unmute requests 166 but may require participant 116 who submitted the mute request 164 to allow or deny the request. For example, in the illustrated example, controller 120 may allow "Participant C" (participant 116c) to send unmute request 166 to unmute media signal 160c but may require "Participant A" (participant 116a) to allow or deny the request before unmuting media signal 160c. As an additional example, controller 120 may apply logic 152 to only allow participants 116 to mute and/or unmute media signals 160 from their own associated endpoints 112. For example, logic 152 may include a rule that only participant 116a may request to mute and/or unmute media signal 160a, only participant 116b may request to mute and/or unmute media signal 160b, and only participants 116c-e may request to mute and/or unmute media signal 160c. Alternatively or in addition, controller 120 may allow submission of other requests but may deny them and/or require authorization from one or more of participants 116 associated with the potentially affected media signal 160 or may require warnings to be sent to those participants 116 associated with the potentially affected media signal 160. These rules may allow one or more advantages. They may allow participants 116 to avoid embarrassing or otherwise unwanted scenarios. For example, they may allow participants 116 to avoid being muted and/or unmuted at inopportune times and/or without warning. The described rules may be used alone or in any suitable combination, according to particular needs.

References to "participants" in conference data 154 may be used to refer to user devices 114 and/or endpoints 112 associated with a particular participant 116 or group of participants 116. For example, mute requester ID 212 of "Participant B" as indicated in row 202b may indicate that the corresponding mute request 164 originated from user device 114b, which is associated with participant 116b.

Figure 3:
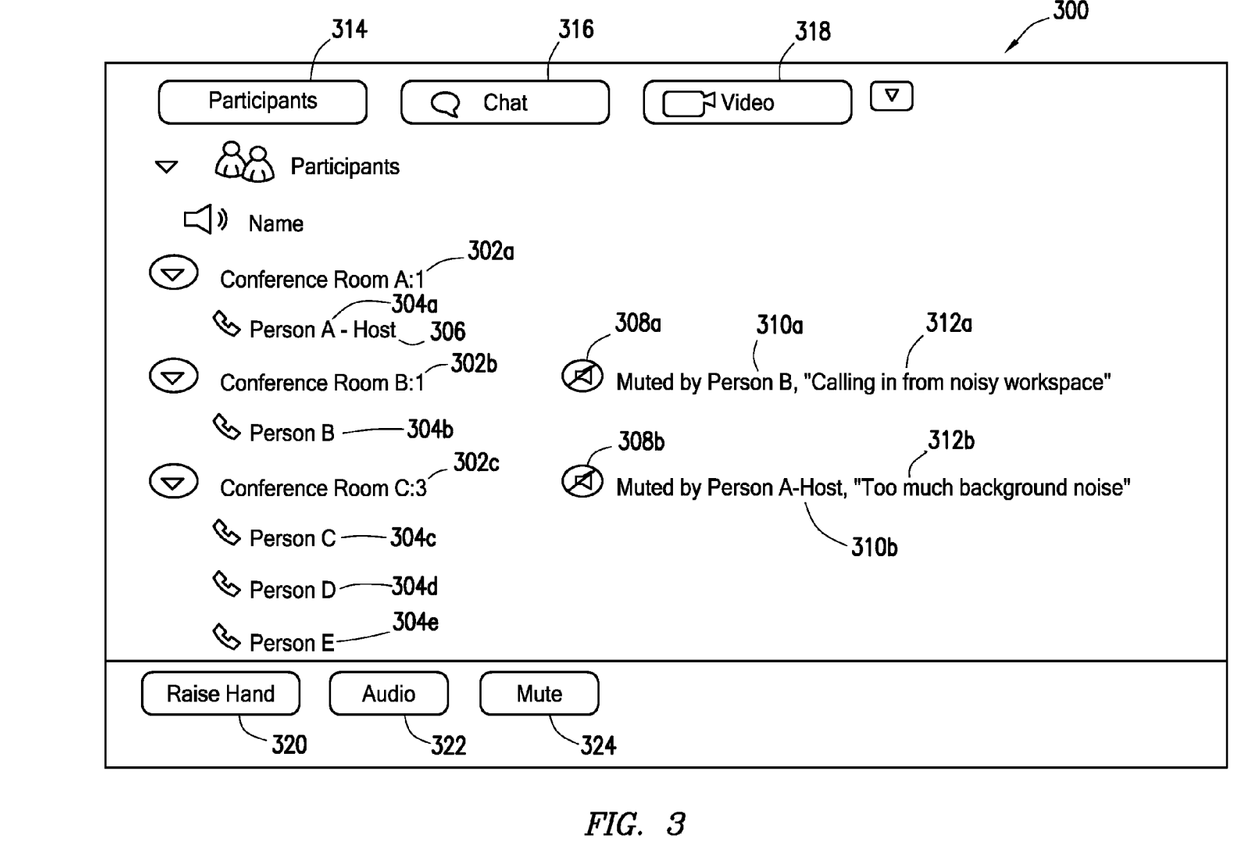
FIG. 3 illustrates an example screenshot of conference-information window that may be generated by the system of FIG. 1, according to certain embodiments of the present disclosure.

FIG. 3 illustrates an example screenshot of conference-information window 300 that may be generated by the system of FIG. 1, according to certain embodiments of the present disclosure. Conference-information window 300 may be one embodiment of a graphical user interface (GUI) which may be displayed on endpoints 112 and/or user devices 114 of conferencing system 100. The GUI may be generally operable to tailor and filter data presented to participants 116. The GUI may provide participants 116 with an efficient and user-friendly presentation of host 208, as well as other information pertaining to the electronic-conference session and/or conferencing system 100. The GUI may additionally provide participants 116 with an efficient and user-friendly way of inputting and submitting join requests 162, mute requests 164, unmute requests 166, or any other suitable input. The GUI may comprise a plurality of displays having interactive fields, pull-down lists, and buttons operated by participant 116. The GUI may include multiple levels of abstraction including groupings and boundaries. It should be understood that the term GUI may be used in the singular or in the plural to describe one or more graphical user interfaces and each of the displays of a particular graphical user interface.

Conference-information window 300 may provide information about the electronic-conference-session participants 116, such as endpoints 112 and user devices 114 that are connected to the electronic-conference session. Fields 302a-c indicate conference locations 110, as well as the number of usernames associated with each location. Fields 304a-e indicate usernames submitted as participants 116 join the electronic-conference session. The usernames are grouped by the location of the corresponding participant 116. For example, field 302a corresponds to "Conference Room A," which may represent a first endpoint 112 (such as endpoint 112a from FIG. 1). Similarly, field 302b corresponds to "Conference Room B," which may represent a second endpoint 112. Field 304b corresponds to "Person B," a username received from user device 114b proximate or equivalent to the second endpoint 112.

Host indicator 306 may be used to communicate the identity of host 208 to participants 116. In the example of FIG. 3, host indicator 306 may indicate that "Person A" is the current host 208. In certain embodiments, conference-information window 300 may include multiple host indicators 306 to communicate the identity of multiple hosts 208 to participants 116, according to particular needs.

Mute indicators 308 may be used to communicate the identity of one or more muted endpoints 112 to participants 116. In the example of FIG. 3, mute indicator 308a may indicate that "Conference Room B" is currently muted. In certain embodiments, conference-information window 300 may include multiple mute indicators 308 to communicate that multiple endpoints 112 are muted, according to particular needs. For example, in the example of FIG. 3, mute indicator 308b may indicate that "Conference Room C" is currently muted.

Mute-requester indicator 310 may be used to communicate the identity of a mute requester associated with a muted endpoint 112 to participants 116. In the example of FIG. 3, mute-requester indicator 310a may indicate that "Conference Room B" is currently muted by "Person B." In certain embodiments, conference-information window 300 may include multiple mute-requester indicators 310, according to particular needs. For example, in the example of FIG. 3, mute-requester indicator 310b may indicate that "Conference Room C" is currently muted by "Person A—Host."

Mute-explanation indicator 312 may be used to communicate the explanation identified by the mute requester associated with a muted endpoint 112 to participants 116. In the example of FIG. 3, mute-explanation indicator 312a may indicate the explanation for "Conference Room B" currently being muted by "Person B" as "Calling in from noisy workspace." In certain embodiments, conference-information window 300 may include multiple mute-explanation indicators 312, according to particular needs. For example, in the example of FIG. 3, mute-explanation indicator 312b may indicate the explanation for "Conference Room C" currently being muted by "Host," as "Too much background noise."

Participants button 314 may be used by participants 116 to view additional information about participants 116 and/or their corresponding endpoints 112 and/or user devices 114.

Chat button 316 may allow participants 116 to send one another text messages. For example, participant 116b may wish to give participant 116a more information than what is displayed to other participants 116 and may use chat button 316 to open a chat window and send the additional information to participant 116a.

Raise hand button 320 may be used by a particular participant 116 to create an indication for one or more other participants 116 that the particular participant 116 would like to speak without interrupting other participants 116 who may be currently speaking.

Audio button 322 may be used by participants to adjust audio settings. For example, participants 116 may use audio button 322 to access a window to adjust volume of all or particular media signals 160 on one or more user devices 114 and/or endpoints 112.

Mute button 324 may be used by participants 116 to input mute requests 164, unmute requests 166, mute explanations, unmute explanations, and/or any other suitable information, according to particular needs.

Conference-information window 300 may provide one or more advantages. For example, information displayed on conference-information window 300 may allow participants 116 to make informed decisions when participating in an electronic-conference session. For example, mute indicators 308, mute-requester indicator 310, and mute-explanation indicator 312 may allow users to make informed decisions about whether to submit unmute requests 166 and/or may allow for avoidance of unwanted scenarios. For example, in the illustrated embodiment, participant 116a (indicated by "Participant A") may see that participant 116b (indicated by "Participant B") has muted himself or herself and has indicated the explanation of "Calling in from busy workspace," and may decide not to submit unmute request 166 to unmute media signal 160b. This may avoid the unwanted scenario of media signal 160b being unmuted when there is substantial noise where participant 116b is located. This information may also provide other advantages. For example, participants 116c-e may not have been paying attention to the excess noise around them. Conference-information window 300 may inform them that participant 106a has muted their corresponding media signal 160c and has indicated "Too much background noise." Participants 116c-e may make efforts to limit the noise around them, as a result, before attempting to unmute their media signal 160c. As an additional example, information in conference-information window 300 may allow participants 116 to avoid excessive changes in status. For example, in traditional systems without a mute explanation, muted participants 116 may not understand why they had been muted and may unmute their associated media signal 160 without solving the problem, such as a problem of too much background noise. The original mute requester may once again mute media signal 160 because of the noise. This may continue multiple times, resulting in a distraction to participants 116 and additional use of processing resources. Conference-information window 300 may allow for the avoidance of this scenario by clearly indicating the mute explanation.

Figure 4:
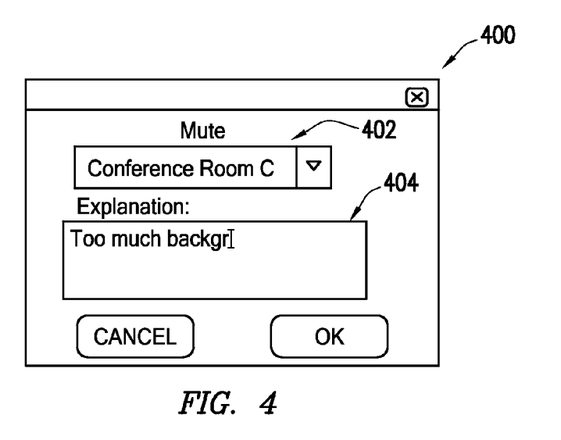
FIG. 4 illustrates an example screenshot of mute-request window that may be generated by the system of FIG. 1, according to certain embodiments of the present disclosure.

FIG. 4 illustrates an example screenshot of mute-request window 400 that may be generated by the system of FIG. 1, according to certain embodiments of the present disclosure. Participants 116 may be able to access mute request window 400 by clicking on mute button 324 of FIG. 3. Participants 116 may select endpoints 112 to mute or unmute, using mute drop-down selector 402. Participants may enter an explanation in explanation field 404. Participants may perform these actions based on their permissions, as determined by logic 152.

Mute-request window 400 may allow certain advantages, such as allowing participants 116 to input descriptive explanations for mute requests 164 and/or unmute requests 166, allowing participants 116 to make informed subsequent decisions and avoid awkward or otherwise unwanted scenarios. For example, allowing participants 116 to input explanations may allow participants 116 to avoid interrupting an electronic-conference session to provide an explanation or submitting mute requests 164 and/or unmute requests 166 without any explanation to other participants 116.

Figure 5:
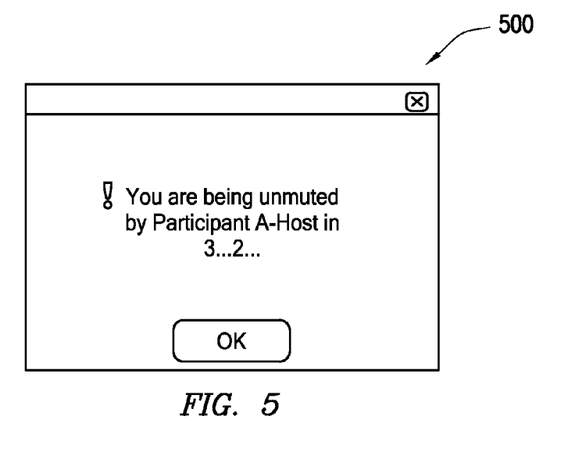
FIG. 5 illustrates an example screenshot of unmute-indicator window that may be generated by the system of FIG. 1, according to certain embodiments of the present disclosure.

FIG. 5 illustrates an example screenshot of unmute-indicator window 500 that may be generated by the system of FIG. 1, according to certain embodiments of the present disclosure. Unmute-indicator window 500 may be one embodiment of a graphical user interface (GUI) which may be displayed on endpoints 112 and/or user devices 114 of conferencing system 100. The GUI may be generally operable to tailor and filter data presented to participants 116. The GUI may provide participants 116 with an efficient and user-friendly presentation of notification 168 to a muted participant 116b that they are being unmuted by another participant 116a. While the example of FIG. 5 shows this as a visual indicator, this indicator could also be accomplished by sound or any other suitable means or combination of suitable means, according to particular needs. For example, user device 114b may sound a warning when participant 116a sends an unmute request 166a for endpoint 112b to be unmuted. User device 114b may sound this warning before controller 120 unmutes endpoint 112b to allow for participant 116b to prepare to be unmuted, at the same time that controller 120 unmutes endpoint 112b, or shortly after controller 120 unmutes endpoint 112b. Unmute-indicator window 500 may allow one or more advantages. For example, unmute-indicator window 500 may allow participants 116 to avoid being unmuted without any warning. This may allow participants 116 to avoid unwanted scenarios, such as when a muted participant 116 is muted, talking without intending for one or more other participants 116 to hear, and unmuted without indication or warning.

Figure 6:
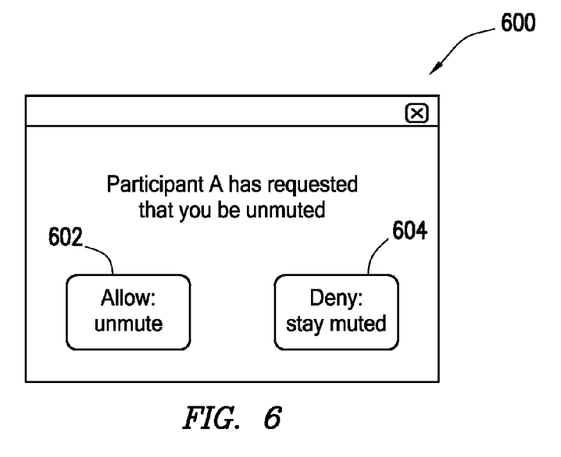
FIG. 6 illustrates an example screenshot of unmute-request-indicator window that may be generated by the system of FIG. 1, according to certain embodiments of the present disclosure.

FIG. 6 illustrates an example screenshot of unmute-request-indicator window 600 that may be generated by the system of FIG. 1, according to certain embodiments of the present disclosure. Unmute-request-indicator window 600 may be one embodiment of a graphical user interface (GUI) which may be displayed on endpoints 112 and/or user devices 114 of conferencing system 100. The GUI may be generally operable to tailor and filter data presented to participants 116. The GUI may provide participants 116 with an efficient and user-friendly presentation of notification 168 to a muted participant 116b that another participant 116a has requested that they be unmuted. Unmute-request-indicator window 600 may be displayed to muted participant 116b when another participant 116a has requested that media signal 160b associated with muted participant 116b be unmuted and may include allow button 602 and deny button 604 for indicating how participant 116b would like to respond to the request. For example, media signal 160b may be muted so that participant 116b is currently in mute state 210 of muted. Participant 116a may submit unmute request 166a for media signal 160b to be unmuted. Controller 120 may apply rules in logic 152 to determine that unmute request 166a must be allowed by muted participant 116b before media signal 160b may be unmuted. Controller 120 may generate notification 168 to user device 114b resulting in unmute-request-indicator window 600 to allow participant 116b to either allow or deny the request using allow button 602 or deny button 604, respectively. Unmute-request-indicator window 600 may allow one or more advantages. For example, unmute-request-indicator window 600 may allow muted participant 116b the opportunity to allow or deny unmute requests 166 and avoid unwanted scenarios, such as being unmuted at an inopportune moment and/or without warning.

Figure 7:
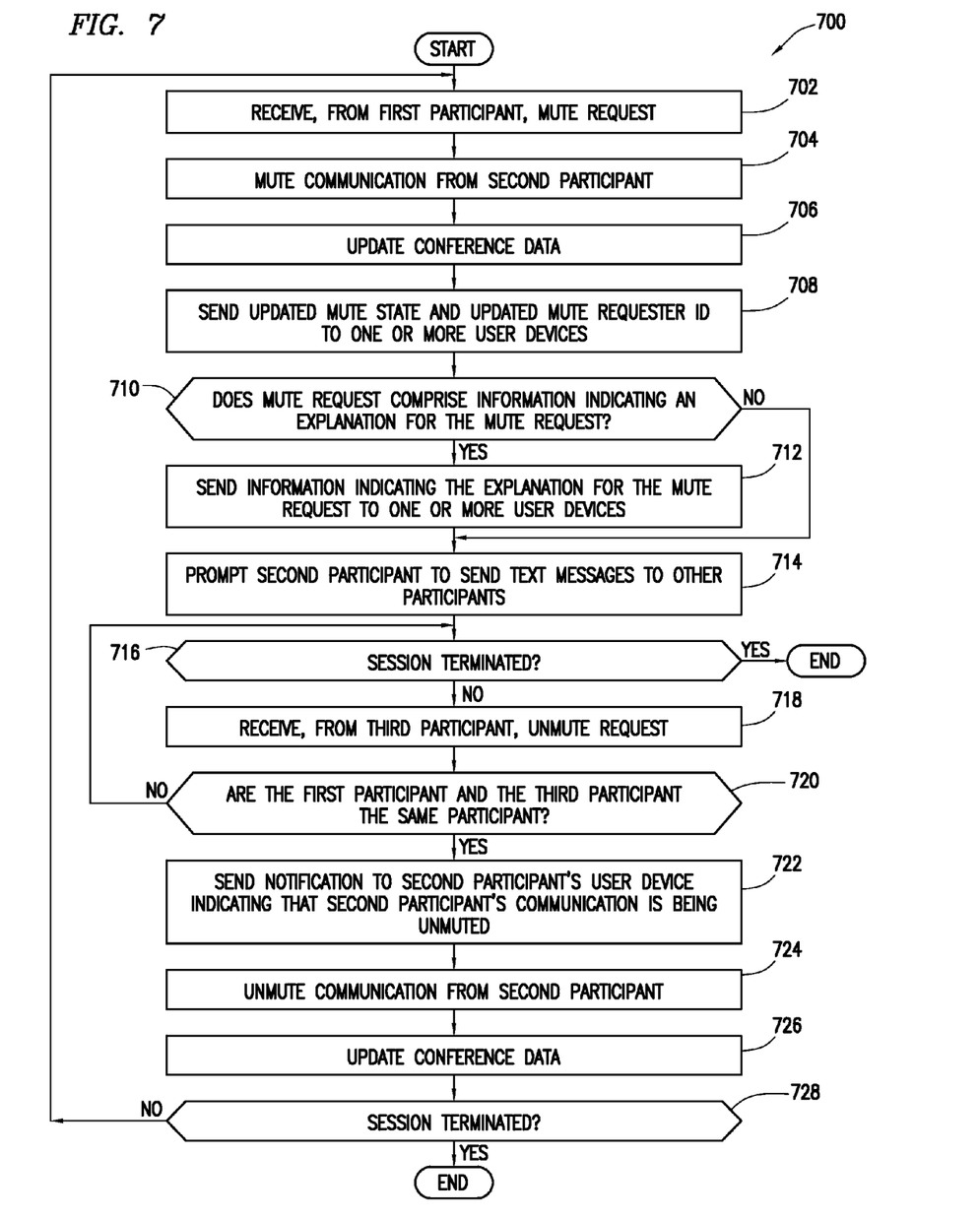
FIG. 7 illustrates an example conferencing method, according to certain embodiments of the present disclosure.

FIG. 7 illustrates an example conferencing method 700, according to certain embodiments of the present disclosure.

At step 702, controller 120 receives mute request 164a from participant 116a. For example, controller 120 may receive a request from participant 116b to mute communication from endpoint 112c or participants 116c-e associated with endpoint 112c. Controller 120 may also receive a mute explanation corresponding to mute request 164a. Mute request 164a may include information indicating a request to mute communication from other participants 116c-e. Alternatively or in addition, mute request 164a may include a request to mute communication from participants 116, endpoints 112, or any other suitable participant 116 or entity. Mute request 164a may include information identifying participant 164a as a mute requester, such as mute requester ID 212. Mute request 164a may include information identifying participants 116c-e as mutees. Mute request 164a may also include information indicating an explanation for mute request 164*a*. For example, participant 116*a* may have indicated "Too much background noise" when inputting mute request 164*a*.

At step 704, controller 120 may mute communication from participants 116*c-e* by stopping transmission of media signal 160*c* to endpoints 112*a* and 112*b*. In certain embodiments, controller 120 may also send notifications 168 to update displays of user devices 114 to indicate that media signal 160*c* from endpoint 112*c* has been muted.

At step 706, controller 120 may update conference data 154. For example, controller 120 may change mute state 210 associated with participants 106*c-e* (indicated by "Participants C-E") from "unmuted" to "muted," may change mute-requester ID 212 from "N/A" to "Participant A" and may change mute explanation 214 from "N/A" to "Too much background noise."

At step 708, controller 120 may send, to one or more user devices 114, updated conference data 154, including the updated mute state 210 and updated mute-requester ID 212. For example, controller 120 may send this information to user devices 114 for display on conference-information window 300 on user devices 114. Alternatively or in addition, controller 120 may send this information to user devices 114 for indication by sound. In the illustrated example, sending this information to user devices 114 may result in it being reflected on conference-information windows 300 of user devices 114.

At step 710, controller 120 may determine whether mute request 164*a* includes information indicating an explanation for mute request 164*a* and/or whether mute explanation 214 has been updated in conference data 154. If controller 120 determines that mute request 164*a* includes information indicating an explanation for mute request 164*a*, method 700 may continue at step 712 or any other suitable step. If controller 120 determines that mute request 164*a* does not include information indicating an explanation for mute request 164*a*, method 700 may continue at step 714 or any other suitable step. In the illustrated embodiment, controller 120 may determine that mute request 164*a* includes a mute explanation and may continue to step 712.

At step 712, controller 120 may send information indicating an explanation for mute request 164*a* to one or more user devices 114. For example, controller 120 may send this information to user devices 114 for display on conference-information window 300 on user devices 114. Alternatively or in addition, controller 120 may send the information to user devices 114 to result in an indication on user devices 114 using sound. In the illustrated embodiment, controller 120 may send the mute explanation of "Too much background noise" to user devices 114 for display on conference-information window 300. This may allow one or more advantages. For example, it may allow participants 116*c-e* to know why they have been muted and attempt to limit the noise around them before trying to unmute their corresponding media signal 160*c*.

At step 714, controller 120 may prompt participants 116*c-e* to send a text (chat) message to one or more participants 116. For example, controller 120 may send a signal to user devices 114*c-e* to result in a pop-up text-message screen on GUIs of user devices 114*c-e*. As another example, controller 120 may send a signal to user devices 114*c-e* to result in instructions for sending text messages being displayed on GUIs of user devices 114*c-e*. This may result in one or more advantages. For example, this may allow muted participants 116*c-e* to easily send text messages to other participants 116 because they cannot currently communicate in the electronic-conference session by speech. While text-message capabilities may be available to users otherwise, providing a prompt, such as a pop-up window for texting and/or instructions, may provide a reminder to muted participants 116*c-e* of an alternative way to participate in the electronic-conference session while in mute state 210 of "muted." Providing a prompt may also allow muted participants 116*c-e*, who may not be familiar using the text-message capabilities of the system, to easily send text messages. This may be helpful, for example, in the middle of an electronic-conference session because muted participants 116*c-e* may avoid the distraction of determining how to initiate and/or use the text-message functionality. For example, participant 116*c* may be unfamiliar with the text-message functionality of conferencing system 100 when mute request 164*a* results in media signal 160*c* associated with participant 116*c* being muted. A prompt to use text messaging may allow participant 116*c* to easily communicate with participants 116 associated with other conference locations 110 without having to determine how to initiate the text-message functionality of conferencing system 100. A text message may be any communication comprising text. For example, a text message may be an e-mail, an instant message, a short-message-service (SMS) message, or any other suitable communication.

At step 716, controller 120 may determine whether the electronic-conference session has been terminated. For example, controller 120 may determine that the electronic-conference session has terminated because all participants 116 have signed out of the electronic-conference session on their respective user devices 114. If controller 120 determines that the electronic-conference session has terminated, the method may end. If controller 120 determines that the electronic-conference session has not terminated, the method may continue at step 718 or any other suitable step.

At step 718, controller 120 may receive unmute request 166*a* from participant 116*a*. Unmute request 166*a* may include information indicating a request to unmute the communication from participants 116*c-e*. Unmute request 166*a* may include information, such as mute requester ID 212, identifying participant 116*a* as an unmute requester. Unmute request 166*a* may include information identifying participants 116*c-e* as unmutees.

At step 720, controller 120 may determine whether the mute requester and the unmute requester are the same participant 116. In the illustrated example, participant 116*a* is both the mute requester and the unmute requester. If controller 120 determines that the mute requester and the unmute requester are the same participant 116, method 700 may continue at step 722. If the mute requester and the unmute requester are not the same participant 116, method 700 may continue at step 716 and may send notification 168 to the unmute requester's user device 114, indicating that the corresponding unmute request 166 is denied.

At step 722, controller 120 may send notifications 168*c-e* to user devices 114*c-e* indicating that communications from participants 116*c-e* are being unmuted. This may allow participants 116*c-e* to have a warning that media signal 160*c* is being unmuted and other participants 116*a-b* may soon or currently be able to hear them. This may allow participants 116 to avoid embarrassing or otherwise unwanted scenarios.

At step 724, controller 120 may unmute communication from participants 116*c-e*. Specifically, controller 120 may perform this step by transmitting media signal 160*c* to user devices 114*a-b* and/or endpoints 112*a-b*.

At step 726, controller 120 may update conference data 154. For example, controller 120 may change mute state 210 associated with participants 106*c-e* ("Participants C-E") from "muted" to "unmuted," may change mute-requester ID 212 from "Participant A" to "N/A" and may change mute explanation 214 from "Too much background noise" to "N/A."

At step 728, controller 120 may determine whether the electronic-conference session has terminated. For example, controller 120 may determine that the electronic-conference session has terminated because all participants 116 have signed out of the electronic-conference session on their respective user devices 114. If controller 120 determines that the electronic-conference session has terminated, method 700 may end. If controller 120 determines that the electronic-conference session has not terminated, method 700 may continue at step 702.

Modifications, additions, or omissions may be made to method 700 disclosed herein without departing from the scope of the disclosure. The methods may include more, fewer, or other steps. For example, controller 120 may require a potential mutee and/or unmutee to authorize the mute or unmute of their communication. For example, in response to receiving unmute request 166a to unmute media signal 160c associated with participants 116c-e, controller 120 may send notifications 168 to one or more of user devices 114c-e indicating that unmute request 166a has been received and prompting one or more of participants 116c-e to either allow or deny unmute request 166a. For example, notifications 168c-e may result in unmute-request-indicator windows 600 being displayed on one or more user devices 114c-e and allowing one or more of participants 116c-e to allow or deny unmute request 166a using allow button 602 or deny button 604, respectively. In the case where multiple participants 116 are associated with the potentially affected media signal 160, unmute-request-indicator windows 600 may appear on one of user devices 114 associated with participants 116, according to predetermined permissions as indicated in conference data 154, to allow one participant 116 to make the decision to allow or deny the request. For example, participant 116c may have permission to allow or deny such requests regarding media signal 160c on behalf of participants 116c-e so that unmute-request-indicator window 600 only appears on user device 114c. This may allow for more efficient decision making. Alternatively, allowing or denying may require consent by multiple participants 116 of the potentially affected participants 116c-e so that unmute-request-indicator window 600 appears on multiple user devices 114 of the potentially affected participants 116. In such a case an allowance or denial of unmute request 166 may require consensus, as indicated by similar selection of either allow button 602 or deny button 604. In addition or alternatively, similar steps may be followed for mute requests 164. Participants 116 identified as host 208 may have special permissions that allow muting and unmuting with or without permission, and participants 116 who are not identified as host 208 may lack such permissions. Instead of receiving mute requests 164 and unmute requests 166 and determining whether the associated mute requesters and unmute requesters have authority to mute and/or unmute, controller 120 may only allow authorized participants 116 to input the authorized requests by enabling corresponding buttons on the displays of user devices 114 of participants 116 with such permissions. For example, controller 120 may determine that participant 116a has authority to mute participants 116c-e and, in response to that determination, may send notification 168 to user device 114a of participant 116a to include an option to mute participants 116c-e on conference display 300. Additionally, steps may be performed in parallel or in any suitable order. For example, controller 120 may update conference data 154 before muting communication from one or more participants 116 at step 704.

According to certain embodiments of the present disclosure, disadvantages and problems associated with previous systems for providing electronic-conference sessions between participants at remote locations may be reduced or eliminated.

Certain embodiments of the disclosure may provide one or more advantages. For example, providing participants 116 in an electronic-conference session with improved information regarding mute status and corresponding mute requesters and explanations may allow participants 116 to make informed decisions regarding subsequent requests, allowing participants 116 to avoid embarrassing or otherwise unwanted scenarios. This may also allow participants 116 to avoid excessive changes in status due to limited information. This may also allow participants 116 to effectively and efficiently respond to the information and may allow for effective communication of status information without interruption of the electronic-conference session. These advantages may allow for fewer distractions for participants 116 and may reduce excessive use of processing resources. As another example, having rules that allow only certain participants 116 with permission to change mute status may similarly allow participants 116 to avoid embarrassing or otherwise unwanted scenarios and excessive changes to status. As another example, providing warnings to participants 116 who may be affected by a change in mute status may allow them an opportunity to prepare for and/or respond to the change in status. As another example, requiring potentially affected participants 116 to allow or deny requested changes to mute status may similarly allow participants 116 to avoid embarrassing or otherwise unwanted scenarios. As a further example, providing a text-message prompt to muted participants 116 may allow the muted participants 116 to effectively and efficiently communicate with other participants 116.

Certain embodiments of the present disclosure may include some, all, or none of the above advantages. One or more other technical or other advantages may be readily apparent to those skilled in the art from the figures, descriptions, and claims included herein.

Although the present disclosure has been described in several embodiments, a myriad of changes and modifications may be suggested to one skilled in the art, and it is intended that the present disclosure encompass such changes and modifications as fall within the scope of the present appended claims.

What is claimed is:
1. A system comprising:
a memory; and
a processor operable to:
 receive, from a first participant of a plurality of participants in an electronic-conference session, a mute request, the mute request comprising:
  information indicating a request to mute communication from a second participant of the plurality of participants in the electronic-conference session;
  information identifying the first participant as a mute requester; and
  information identifying the second participant as a mutee;
 mute, in response to the mute request, communication from the second participant;
 send, to one or more user devices, a first notification including the information identifying the first participant as the mute requester and the information identifying the second participant as the mutee;
 wherein the processor is further operable to:

receive, form a third participant of the plurality of participants in the electronic-conference session, an unmute request, the unmute request comprising:
information indicating a request to unmute communication from the second participant;
information identifying the third participant as an unmute requester; and
information identifying the second participant as an unmutee;
determine that the mute requester and the unmute requester are not the same participant; and
deny unmuting communication from the second participant, based on determining that the mute requester and the unmute requester are not the same participant.

2. The system of claim 1, wherein the mute request further comprises information indicating an explanation for the mute request.

3. The system of claim 2, wherein the processor is further operable to send a second notification including the information indicating the explanation for the mute request to one or more user devices.

4. The system of claim 1, wherein the first and second participants are the same participant.

5. The system of claim 1, wherein the processor is further operable to send a second notification, to a user device of the third participant, indicating that the request to unmute communication from the second participant is being denied.

6. The system of claim 1, wherein the processor is further operable to prompt, in response to muting communication from the second participant, the second participant to send a text message to one or more participants in the electronic-conference session.

7. A non-transitory computer-readable medium comprising logic that, when executed by one or more processors, is operable to perform operations comprising:
receiving, from a first participant of a plurality of participants in an electronic-conference session, a mute request, the mute request comprising:
information indicating a request to mute communication from a second participant of the plurality of participants in the electronic-conference session;
information identifying the first participant as a mute requester; and
information identifying the second participant as a mutee;
muting, in response to the mute request, communication from the second participant;
sending, to one or more user devices, a first notification including the information identifying the first participant as the mute requester and the information identifying the second participant as the mutee;
receive, from a third participant of the plurality of participants in the electronic-conference session, an unmute request, the unmute request comprising:
information indicating a request to unmute communication from the second participant;
information identifying the third participant as an unmute requester; and
information identifying the second participant as an unmutee;
determine that the mute requester and the unmute requester are not the same participant; and
deny unmuting communication from the second participant, based on determining that the mute requester and the unmute requester are not the same participant.

8. The non-transitory computer-readable medium of claim 7, wherein the mute request further comprises information indicating an explanation for the mute request.

9. The non-transitory computer-readable medium of claim 7, further comprising logic that, when executed by one or more processors, is operable to send a second notification including the information indicating the explanation for the mute request to one or more user devices.

10. The non-transitory computer-readable medium of claim 7, wherein the first and second participants are the same participant.

11. The non-transitory computer-readable medium of claim 7, further comprising logic that, when executed by one or more processors, is operable to send a second notification, to a user device of the third participant, indicating that the request to unmute communication from the second participant is being denied.

12. The non-transitory computer-readable medium of claim 7, further comprising logic that, when executed by one or more processors, is operable to prompt, in response to muting communication from the second participant, the second participant to send a text message to one or more participants in the electronic-conference session.

13. A method, comprising:
receiving, from a first participant of a plurality of participants in an electronic-conference session, a mute request, the mute request comprising:
information indicating a request to mute communication from a second participant of the plurality of participants in the electronic-conference session;
information identifying the first participant as a mute requester; and
information identifying the second participant as a mutee; and
muting, in response to the mute request, communication from the second participant;
sending, to one or more user devices, the information identifying the first participant as the mute requester and the information identifying the second participant as the mutee;
receiving, from a third participant of the plurality of participants in the electronic-conference session, an unmute request, the unmute request comprising:
information indicating a request to unmute communication from the second participant;
information identifying the third participant as an unmute requester; and
information identifying the second participant as an unmutee;
determining that the mute requester and the unmute requester are not the same participant; and
denying unmuting communication from the second participant, based on determining that the mute requester and the unmute requester are not the same participant.

14. The method of claim 13, wherein the mute request further comprises information indicating an explanation for the mute request.

15. The method of claim 14, further comprising sending the information indicating the explanation for the mute request to one or more user devices.

16. The method of claim 13, wherein the first and second participants are the same participant.

17. The method of claim 13, further comprising sending a second notification, to a user device of the third participant, indicating that the request to unmute communication from the second participant is being denied.

* * * * *